(12) United States Patent
Bloechl

(10) Patent No.: US 11,550,016 B2
(45) Date of Patent: *Jan. 10, 2023

(54) APPARATUS AND METHOD FOR MITIGATING INTERFERENCE WHEN PHASE RANGING AMONG BEACONS AND TAGS

(71) Applicant: Link Labs, Inc., Annapolis, MD (US)

(72) Inventor: Mark O. Bloechl, Elkridge, MD (US)

(73) Assignee: Link Labs, Inc., Annapolis, MD (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/066,679

(22) Filed: Oct. 9, 2020

(65) Prior Publication Data

US 2021/0405143 A1    Dec. 30, 2021

Related U.S. Application Data

(63) Continuation of application No. 16/911,690, filed on Jun. 25, 2020, now Pat. No. 10,845,451.

(51) Int. Cl.
*G01S 1/30* (2006.01)
*G01S 1/02* (2010.01)
*G01S 1/04* (2006.01)

(52) U.S. Cl.
CPC .............. *G01S 1/30* (2013.01); *G01S 1/024* (2013.01); *G01S 1/026* (2013.01); *G01S 1/045* (2013.01); *G01S 1/0428* (2019.08)

(58) Field of Classification Search
None
See application file for complete search history.

(56) References Cited

U.S. PATENT DOCUMENTS

| | | | |
|---|---|---|---|
| 10,264,436 B1 | 4/2019 | Wohler et al. | |
| 11,317,246 B1 * | 4/2022 | Pipher | G06K 19/0723 |
| 2015/0003433 A1 | 1/2015 | Sinha et al. | |
| 2018/0367973 A1 | 12/2018 | Bloechl et al. | |
| 2019/0094332 A1 | 3/2019 | Sackenreuter et al. | |
| 2019/0285722 A1 * | 9/2019 | Markhovsky | G01S 1/042 |
| 2020/0100067 A1 | 3/2020 | Wihardja et al. | |
| 2020/0113006 A1 | 4/2020 | Bloechl et al. | |

OTHER PUBLICATIONS

Internatonal Search Report and Written Opinion issued in application No. PCT/US2021/024806 dated Jun. 21, 2021.

* cited by examiner

*Primary Examiner* — Douglas X Rodriguez
(74) *Attorney, Agent, or Firm* — Charles B. Lobsenz; Brian H. Buck; Potomac Law Group, PLLC

(57) ABSTRACT

A communications system, including at least one tag and a plurality of beacons. The tags are configured to detect beacon advertisement messages, initiate a connection with at least one of the plurality of and transmit a Constant Tone (CT) to the at least one of the plurality of beacons. The tag is further configured to determine a location thereof based on the sampled CT from both the beacon and the tag and then report the location via the one of the beacons and/or an access point. Phase ranging mitigation techniques which include hop duplication, hop interpolation and ADC DC offset correction are employed so as to provide more accurate ranging values even in the case where there are many other devices in local proximity and which are competing for use of the same RF channels as those used by the tags and beacons.

18 Claims, 13 Drawing Sheets

APPARATUS AND METHOD FOR MITIGATING INTERFERENCE WHEN PHASE RANGING AMONG BEACONS AND TAGS

CROSS-REFERENCE TO RELATED APPLICATIONS

This application is a continuation of application Ser. No. 16/911,690, filed Jun. 25, 2020, the entire contents of which are hereby incorporated by reference.

FIELD OF THE DISCLOSURE

Disclosed embodiments relate to wireless communications systems and the operation thereof, and more specifically, to ranging techniques associated with connected devices in such systems and the improvement of ranging estimations associated therewith.

BACKGROUND

There are many different applications which require the physical location of objects to be determined and/or tracked over time. Examples include asset tracking solutions such as those deployed in hospitals, warehouses, manufacturing facilities and construction locations. Other solutions involve the tracking of people such as in assisted living facilities or various work environments where knowing the physical location of people over time and/or at the current moment is an important characteristic of overall performance.

These applications, often referred to as "Real Time Location Systems" or "RTLS", are used in any number of scenarios in which the location of one or more physical objects are tracked over time. Typically, the objects being tracked are "tagged" with small wireless capable tags that are attached to the object(s) being tracked. These tags are ideally low cost and transmit using a low power protocol such as Bluetooth or Bluetooth Low Energy (BLE).

Object tracking applications are typically implemented using a user interface which shows the location of the tags in real time in graphical form or via some other reporting format. Location of the tags as they move around may be accomplished via various ranging techniques in which the distance between the tag and one or more system components (herein generically referred to as a "beacon") is determined. The RTLS generally requires that multiple beacons are used in the location determination. These locations are collectively used to calculate a real time geographical position for the tag and thus a position for the object(s) being tracked as a result of being attached to or otherwise in the immediate physical vicinity of the tag.

In some RTLS systems, one or more beacons "advertise" their presence via periodic wireless transmissions and when a location determination is required, a predetermined handshaking process occurs between the tag and the beacons after which ranges are determined and a location calculation is made. Alternatively, other RTLS systems function such that the tag instead advertises its presence to the beacon and initiates the handshaking protocol when a location determination is required.

As one might imagine, accurate location determination for objects in these RTLS systems is directly dependent on the accuracy of the ranging values calculated between the tags and each of the beacons. In some systems, a minimum of four (4) beacon-tag ranges is preferred in order to establish a confident geographic coordinate for the tag. If even one of the ranges calculated diverges even minimally from the actual value, the location estimation for the tag can be unusably inaccurate. By way of example, in a hospital environment, while it may not be a requirement to know exactly where in the room a specific piece of equipment is located, at least knowing which room the equipment is in would typically be a minimum requirement. If ranging error is significant enough, the wrong room for a piece of equipment could be reported.

Ranging errors can be caused by a number of factors including environmental conditions such as noise, multipath channel effects, clock synchronization and sampling artifacts. Time synchronization and frequency accuracy, or lack thereof, as between the tag and the beacons, can significantly affect ranging accuracy because of the high rate of radio wave propagation. As a result, even small timing errors can cause very significant ranging errors.

Even with the above, perhaps the most significant source of ranging errors results from interference due to the collision of transmissions on the same frequencies. In many cases, an RTLS deployment in an industrial, office or even residential environment will necessarily have to co-exist with other RF systems which transmit on the same frequencies as are used by the RTLS system. For example, the multitude of devices operating on WiFi networks will often interfere with the beacon-tag transmissions since both often operate, at least to some degree, in the same unlicensed spectrum.

Thus, it would be desirable to provide one or more RTLS systems and related operating characteristics that address and overcome the aforementioned impediments and disadvantages now associated with the conventional RTLS systems. More specifically, it would be desirable to provide such functionality in connection with various application environments such as in the cases where RTLS is deployed to provide any or all of the following: proximity sensing, alert systems, jobsite and warehouse asset monitoring, tracking assets to be inventoried and for which location must be determined, as well as many others.

In particular, it would be desirable to provide more accurate ranging capabilities in these RTLS systems through various techniques and systems as disclosed herein and in which known impediments to ranging accuracy can be largely overcome such as through the mitigation of channel interference particularly in deployments where many RF devices are competing for the use of the same scarce spectrum resources.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the invention, in one embodiment thereof, includes a BLE communications system, including at least one tag, at least one access point configured to connect to a network and to transmit a first beacon advertisement message, and a plurality of beacons configured to transmit a second beacon advertisement message. The tags are configured to detect the first and second beacon advertisement messages, initiate a connection with at least one of the plurality of beacons at a first frequency, and transmit a Constant Tone (CT) to the at least one of the plurality of beacons. Alternatively, the system of the present invention could omit the aforementioned at least one access point and, instead, one or more of the beacons could provide the functionality which is otherwise described herein as being performed by an access point.

In another aspect of the invention, the at least one of the plurality of beacons is configured to receive the CT, and sample the CT in in-phase and quadrature (IQ) format, transmit the sampled CT, a signature CT, and position information to the tag at the first frequency. The tag is further configured to determine a location thereof based on the sampled CT, the signature CT, and the position information, and then report the location via the access point and/or one of the beacons.

In yet another aspect of the present invention, phase ranging mitigation techniques which include hop duplication, hop interpolation and receiver ADC DC offset correction as further described herein are employed so as to provide more accurate ranging values even in the case where there are many other devices in local proximity and which are competing for use of the same RF channels as those used by the tags and beacons.

According to embodiments of the present invention, duplicate hops may be added to the phase ranging process in case one or more of the hops is corrupted as a result of an interfering transmission. Further, a process is described in which hops that are determined to be corrupted as a result of an interfering transmission may be replaced with interpolated data obtained from an alternative hop obtained from a neighboring channel. In addition, the present invention may, in some embodiments, operate to detect and compensate for DC offsets during phase ranging measurements which typically result in connection with the use of direct conversion receivers.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
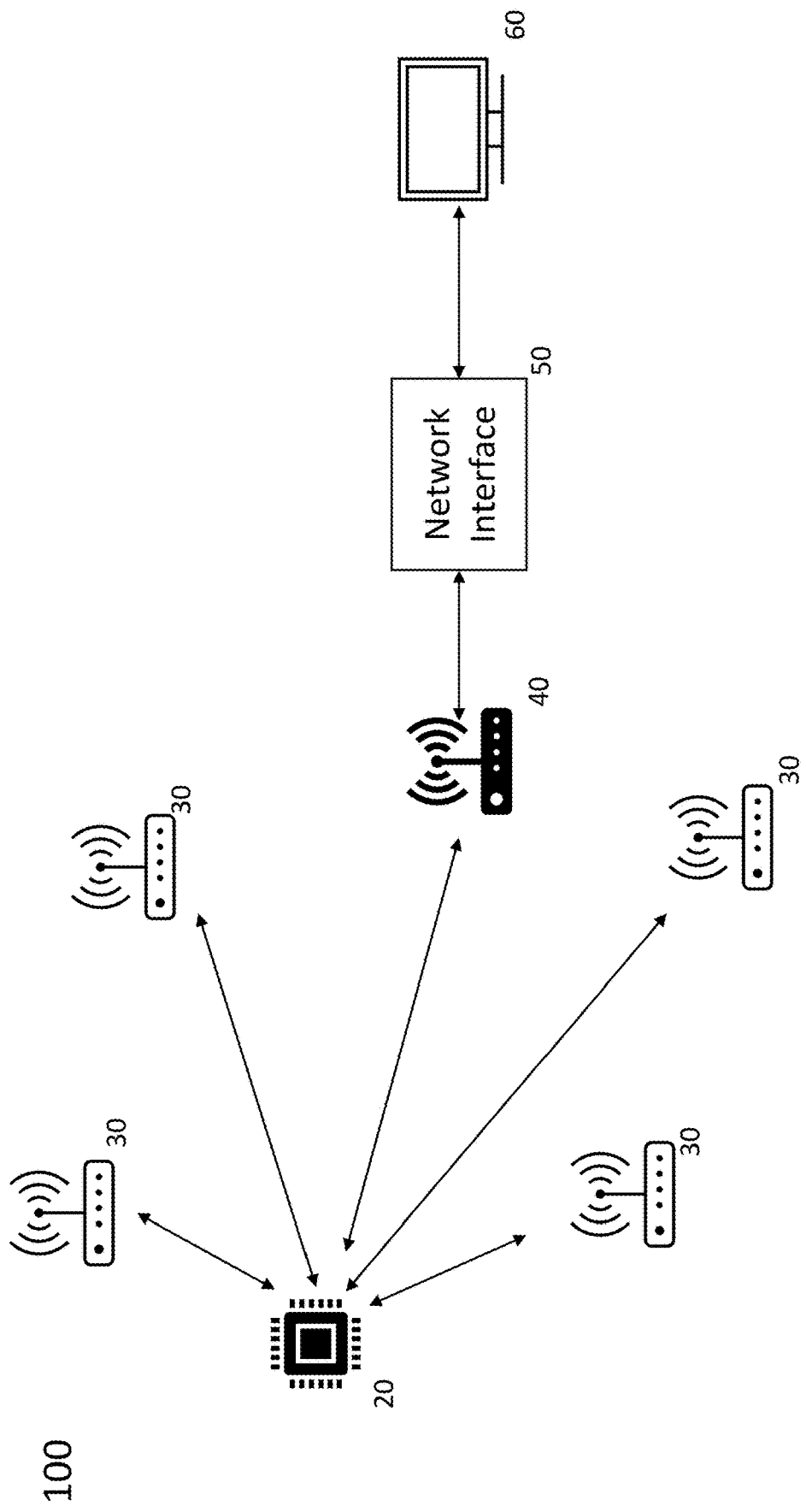
FIG. 1 is an illustration of a network providing location determination functionality in accordance with the teachings of the present invention.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

While the present invention is described herein the context of a BLE network, the teachings are not necessarily limited thereto. Other wireless network protocols may also be used to provide location determination functionalities while still obtaining the benefits of the present invention. Turning now to FIG. 1, a description of the system 100 of the present invention is provided in one embodiment thereof.

System 100 typically includes multiple tags 20—only one is shown in FIG. 1 for clarity. Tag 20 may, in one embodiment, comprise a BLE tag which may be attached to or associated with a particular object for the purposes of tracking the location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked according to the present invention. Beacons 30 are installed in these locations and during the time of installation, their specific locations are entered into system 100 so that system 100 is always aware of the known exact physical locations of each such beacon 30.

System 100 may also include one or more access points 40. These access points may also serve in the same capacity as beacons 30 in that their location is known to system 100 and such that they may communicate with tags 20 as described herein for the purpose of location determination as more fully described herein. In addition access points 40, if present, also provide a connection to network interface 50 which permits data to be shared with and received from other networks such as the internet. This functionality may alternatively be provided by one or more beacons 30 in lieu of access point 40. In one embodiment of the present invention, data is transmitted and received via backhaul to the internet such that a cloud based application may be accessed by a user via client 60 to view object location information and also to allow the user to configure various aspects related to the functionality of system 100.

In a preferred embodiment of the present invention, the roles of tags 20 on the one hand and beacons 30 and/or access points 40 are reversed from their typical roles. More specifically, in this embodiment, tags 20 are responsible for initiating the location determination process as well as performing the location determination process locally and then reporting the location determination to system via a communication to an access point 40 (or a beacon 30).

In other words, in no way is the access point 40 responsible for evaluating and/or determining any aspect or aspects of whether to make a connection between a respective access point 40 and a respective tag 20, and whereas such aspect or aspects, rather, are solely evaluated and/or determined by tag 20 so that tag 20, itself, is enabled to then solely initiate and/or establish the aforementioned connection, if doing so is deemed appropriate by tag 20. This "role reversal" aspect is more fully described in US Patent Publication No. 2020/0113006A1 entitled "BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL" which is assigned to the assignee of the present application and is hereby incorporated by reference.

Figure 2:
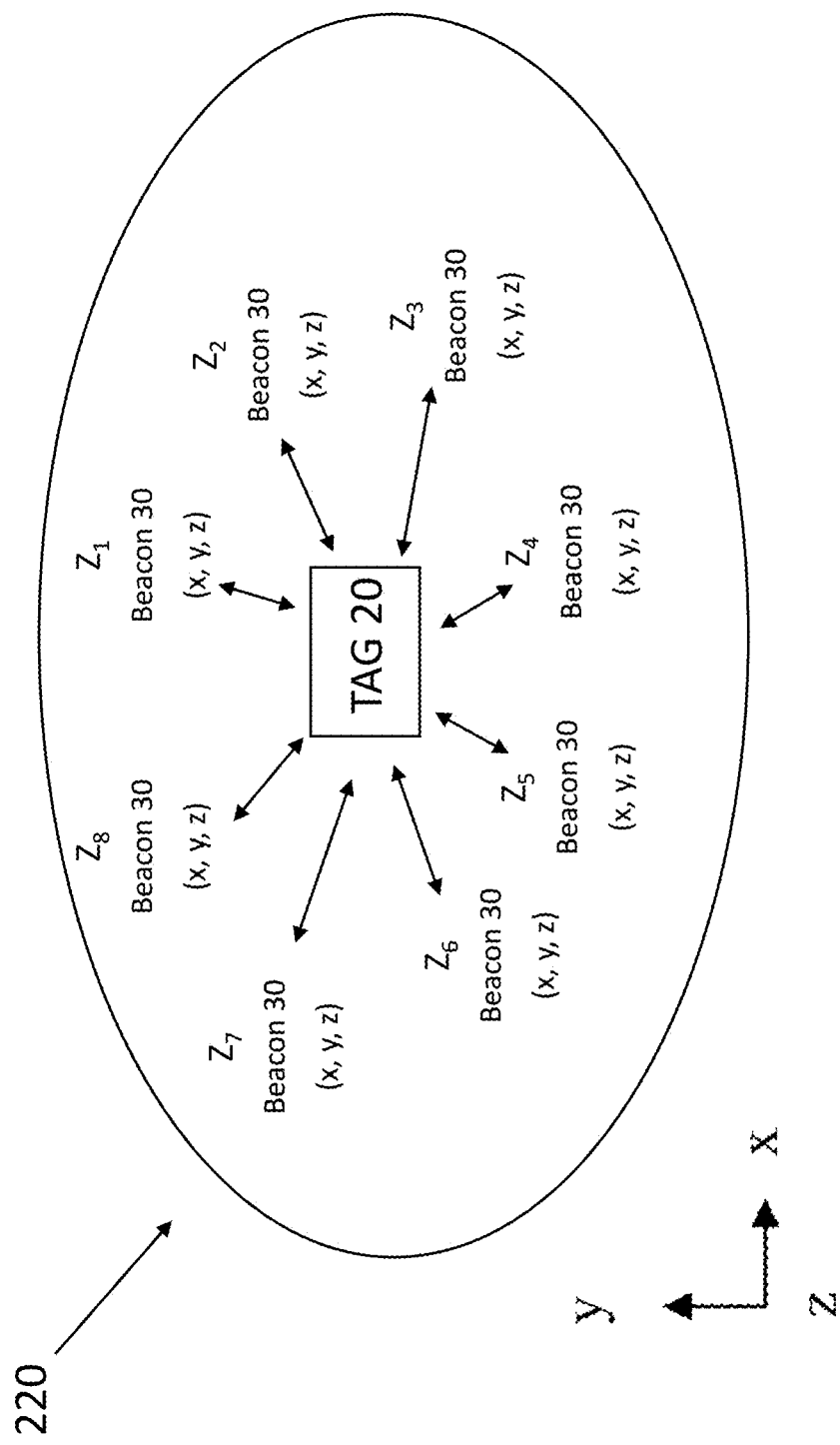
FIG. 2 is an illustration of an area configuration of beacons relative to which a tag may determine a nearest proximity to one or more of such beacons according to embodiments disclosed herein.

With reference now to FIG. 2, a description of the communication protocol by and between tag 20 and beacons 30 within system 100 and according to one preferred embodiment of the present invention is provided. Accordingly, tag 20 may be configured to interact with a beacon 30 to exchange BLE communications in connection with making a real time location determination for the tag 20. As such, each of the tags 20 and the beacons 30 may engage in bidirectional communications in which such communications may be characterized by Constant Tone (CT). In other words, communications sent by each of the tags 20 and beacons 30 may include an appended constant wave tone at, for example, the carrier frequency or an offset of 250 kHz. Such CT may be appended to all communications exchanged between tag 20 and beacon 30, and may be sampled by each tag 20 and beacon 30 in IQ, or quadrature, format. That is, such sampling may be understood wherein I represents the amplitude of an in-phase carrier, and Q represents the amplitude of the quadrature-phase carrier. The sampling may be carried out by each of the tags 20 and beacons 30, as discussed below.

It will be understood that each of the tags 20 and beacons 30 may be equipped with all of the necessary hardware and/or software necessary for executing the aforementioned CT enabled BLE communications, as well as the IQ sampling in connection therewith.

Figure 3:
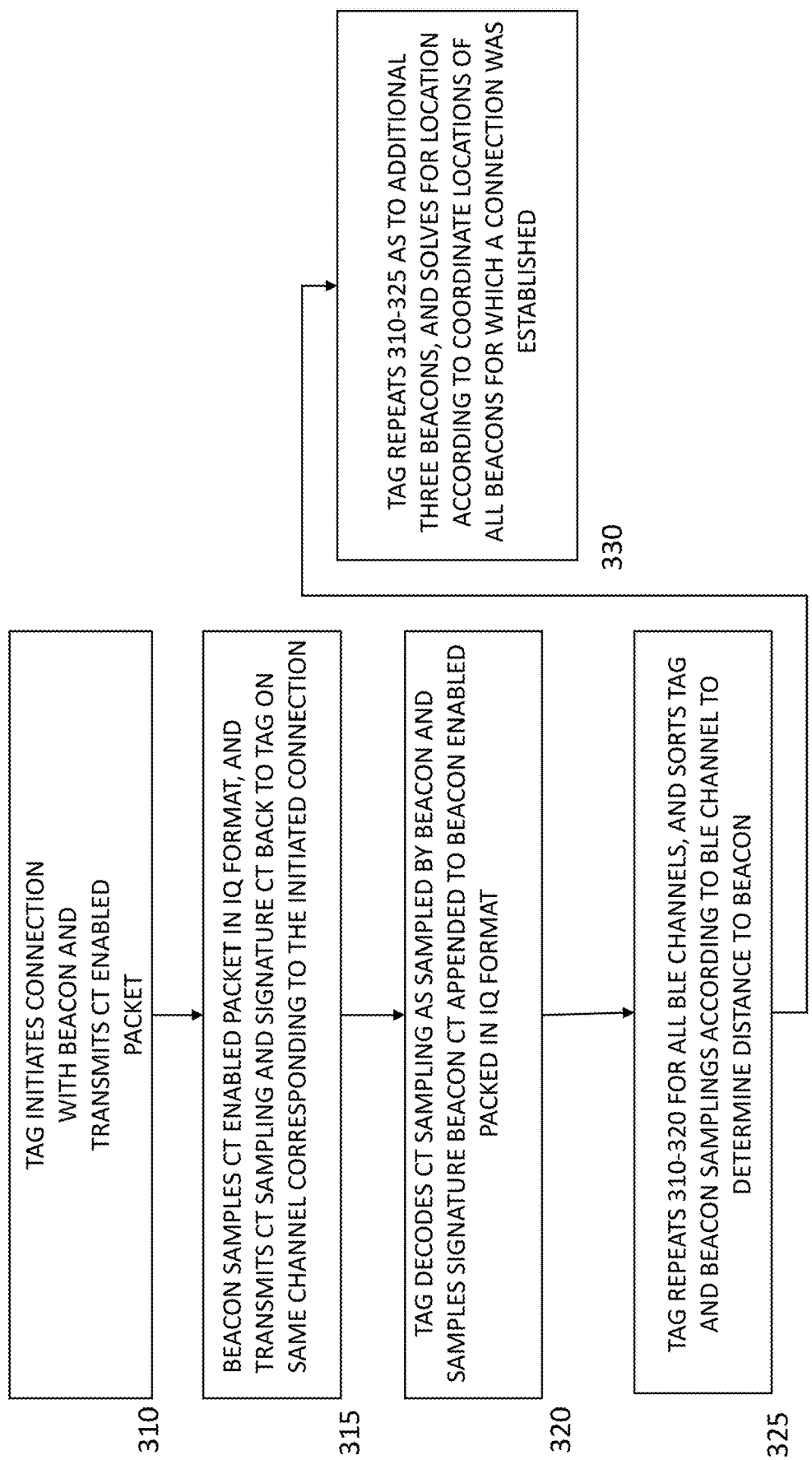
FIG. 3 is a sequence diagram setting forth a manner of location determination by a tag according to Constant Tone (CT) encoding according to one embodiment of the present invention.

With reference to FIGS. 2 and 3, tag 20 (or Node A as referred to in the equations below) may perform a scan within setting 220 to detect those beacons 30 (or Nodes B as referred to in the equations below) that are enabled to transmit the CT, as will be identified by encoding within a respectively transmitted and received beacon advertisement message. Upon detection of such enablement, tag 20 initiates a connection with the first detected beacon 30, and transmits its CT enabled data packet to such beacon 30, at step 310. Here, the data packet may include information pertaining to the initiation of the BLE connection, according to BLE protocol. In particular, the CT may be described by the following:

$$e^{j(\omega_A t + \phi_A)},$$

in which
e is Euler's number,
j is the square root of −1,
$\omega_A$ is the angular frequency of tag 20's signal, and
$\varphi_A$ is an arbitrary phase shift of tag 20's signal.

The CT is received by beacon 30 as the following:

$$e^{j(\omega_A t + \phi_A + \phi_{AB}(f,r))},$$

in which
$\phi_{AB}$ (f,r) is the phase shift introduced during propagation, given as a function of frequency (f) and range (r) by $\phi(f,r) = -2\pi f r/c$, where c is the speed of light.

With reference to step 315, once the CT enabled packet is received at beacon 30, beacon 30 conducts its own I/Q sampling of the CT transmitted by tag 20, and stores the same. Thereafter, beacon 30 transmits that I/Q sampling back to tag 20 as a response data packet to which a signature CT of beacon 30 is also appended. With respect to a signal transmission, tag 20 may correct for phase and frequency offsets, according to:

$$e^{j((\omega_A - \omega_B)t + \phi_A - \phi_B + \phi_{AB})} e^{j(-(\omega_A - \omega_B)t + \phi_A + \phi_B + \phi_{AB})} =$$
$$e^{j2\phi_{AB}(f,r)} = Z(f,r),$$

in which Z represents the signal after being converted to complex baseband.

As a result, tag 20 effectively receives not only the signature CT of beacon 30, but also the result of beacon 30 sampling of its own CT. Similar to beacon 30, tag 20 conducts IQ sampling of the beacon 30 signature CT, and decodes the received response data packet to obtain beacon 30 sampling of its own CT which had been initially transmitted to beacon 30, as at step 320. That is, tag 20 is now in possession of two sets of discrete CT data, including sampling of its CT as transmitted to beacon 30, as well as sampling of beacon 30 signature CT performed after receipt of the beacon 30 response data packet and as a result of the BLE exchange. In another embodiment of the present invention, the tones may be transmitted on their own (without a preceding packet), and the data samples are sent in a block after all of the tone hops are complete.

Both sets of discrete CT data are stored by tag 20 according to a same channel within the BLE band and a calculated ending phase of the beacon 30 CT enabled data packet. The ending phase may be calculated by tag 20 according to beacon 30 transmitted data and based on a formula empirically determined from phase measurements of the chipset generating the transmitted signal. Said alternatively, the exchange, i.e., the transmission and receipt of CT enabled data packets between tag 20 and beacon 20, occurs without deviation among channels of the BLE band.

With reference to step 325, tag 20 repeats steps 310 through 325 for all channels of the BLE band that are available for data transmission, in order to determine a distance to beacon 30 with which communication has occurred.

This way, multiple exchanges of such CT enabled packets may occur individually on and for all 37 channels of the BLE band that are available for data transmission. When the last channel is exhausted, beacon 30 transmits its own x,y,z coordinate within setting 220. Alternatively, beacon 30 may transmit its x,y,z, coordinate in each response data packet transmitted to tag 20 at the conclusion of a same channel communication between tag 20 and beacon 30.

In regard to such distance determination, and once having accumulated the CT sampling as performed by beacon 30 on the initially transmitted tag 20 CT and the IQ sampling of the signature CT appended to the received beacon 30 data packet at each channel of communication, tag 20 sorts those samplings into channel, or frequency, order.

For each channel, tag 20 returns each set of samples to a nominal "starting" phase, by multiplying the same by $e^{(-jx\ end\_phase)}$, in which e is Euler's number, j is the square root of −1, and end_phase represents an ending phase value based on data of each packet. This step is not needed in the case where tones are transmitted by themselves without a preceding data packet. In either case, and thereafter, samples from each phase are averaged over a configurable window. The corresponding samples from each phase are then multiplied together, for each channel. That is, averaged CT samples belonging to tag 20 are multiplied by averaged signature CT samples belonging to beacon 30, for each channel. The resultant yield is a phase measurement sample, for example, Z(n) as referenced above, that is substantially free of phase and frequency offset for each channel.

While samples for the 37 channels have been described as being collected, it is noted that, with respect to others of channels dedicated to solely advertising, an IQ sample may be interpolated from neighboring channels. Accordingly, samples for the entirety of the BLE band may be obtained as a result of the tag 20—beacon 30 bidirectional communication on each of the data communicated channels so as to span the entire BLE band.

A window according to, for example, Hanning or Blackman-Harris, may then be applied to the samples, which may then be zero padded to reach a power of two (2), nominally 128. Thereafter, an Inverse Fast Fourier Transform (IFFT) is performed, after the padding. A peak value (p), in the absence of multipath propagation, may then be selected for use in determining the distance to beacon 30. When multipath propagation is present, a predetermined value, i.e., a value in excess of predetermined threshold, may be selected instead so as to ensure a most direct correlation or path to beacon 30.

A distance to beacon 30 may be then be calculated by tag 20, according to the following:

$$d=(p*c)/(2*IFFT\_LEN*CH\_SPACING),$$

in which
p is the peak of the IFFT, c is the speed of light, IFFT_LEN is the number of samples in the IFFT, and CH_SPACING is the BLE channel spacing in Hz (nominally 2 MHz).

With reference to step 330, tag 20 repeats steps 310 through 325 based on the above discussion in order to acquire distances to each of at least four (4) beacons 30, in total, before proceeding to determine its coordinate location. In this regard, such coordinate location may be derived from the x,y,z, coordinates, i.e., position information, transmitted by each of beacons 30.

To do so, tag 20 may be equipped with any hardware and/or software enabling determination of its location within a three-dimensional space, such as setting 220. Thus, through use of the known position information including coordinates $x_0,y_0,z_0$ to $x_3,y_3,z_3$ of each of the evaluated four (4) beacons 30 and the respective distance d, expressed as a range r below, to each beacon 30, tag 20 may undertake a least squares calculation to derive its own x,y,z coordinate location within setting 220.

Accordingly, tag 20 may undertake the following calculations:

$$A\vec{x}=\vec{b},$$

which may be resolved for $$\vec{x}=(A^TA)^{-1}A^T\vec{b}.$$

Through use of the above, the intersection of those spheres corresponding to the four (4) beacons 30 may be determined as the coordinate location of and by tag 20. In this regard, the spheres may be determined as:

$$(x-x_n)^2+(y-y_n)^2+(z-z_n)^2=r_n^2.$$

A predetermined range of a selected beacon 30 may be used to linearize to obtain:

$$A = \begin{bmatrix} x_1-x_0 & y_1-y_0 & z_1-z_0 \\ x_2-x_0 & y_2-y_0 & z_2-z_0 \\ x_3-x_0 & y_3-y_0 & z_3-z_0 \end{bmatrix},$$

$$\vec{x} = \begin{bmatrix} x-x_0 \\ y-y_0 \\ z-z_0 \end{bmatrix}, \vec{b} = \begin{bmatrix} \frac{1}{2}\left(r_0^2-r_1^2+\left\|\vec{d}_1-\vec{d}_0\right\|_2^2\right) \\ \frac{1}{2}\left(r_0^2-r_2^2+\left\|\vec{d}_1-\vec{d}_0\right\|_2^2\right) \\ \frac{1}{2}\left(r_0^2-r_3^2+\left\|\vec{d}_3-\vec{d}_0\right\|_2^2\right) \end{bmatrix}$$

in which the coordinate location of beacon 30 may be $\vec{d}_n=\{x_n,y_n,x_n\}$, and the Euclidean norm may be given by $\sqrt{\omega_x^2+\omega_y^2+\omega_z^2}$.

Should the communicating beacons 30 be arranged at a same height, i.e., at a same z coordinate, tag 20 may execute a subsequent iterative, non-linear least squares calculation to arrive at its coordinate location relative to the communicating beacons 30.

In view of the above, tag 20 may transfer its determined coordinate location to the network via access point 40 and network interface 50.

When determining its coordinate location, it is to be understood that the tag 20 may employ not only a single set of beacons 30, but multiples thereof in order to more accurately evaluate its position in a three-dimensional space. In other words, tag 20 may determine its coordinate location from among multiple sets of beacons 30 in which each set includes at least four (4) beacons 30, which may or may not be exclusive to another set thereof. For example, first and second sets of beacons 30 may include ones which may be common to each other so long as one among those sets is not common to such first and second sets. In other words, the first and second sets of beacons 30 may be free of at least one shared beacon 30, such that each of the first and second sets of beacons 30 is a unique set thereof, by definition.

While the aforementioned system and process for ranging provides good results, it will be recognized by one of skill in the art that various practical difficulties can arise in actual, real world deployments. In particular, one such difficulty arises when the system is deployed in a physical space where there are other RF transmissions being made by other devices in the vicinity. An example is a co-located or proximately close WiFi access point communicating with one or more devices such as smartphones, computers, televisions, printers and other consumer and/or industrial devices. Depending upon the transmission power and the physical proximately of the WiFi transmitter(s), the RF signals can and do interfere with the signals employed in many RTLS systems.

This is largely driven by the fact that both WiFi and RTLS systems typically use unlicensed spectrum such as in the spectrum available in the 2.4 GHz ISM band. This spectrum is very congested with many different devices competing for use of the relevant channels in the same space or within close proximity of each other. Transmissions which are made by WiFi enabled devices often interfere with the processing of ranging calculations as described above because the WiFi signals can be misinterpreted as being generated by tag 20 and/or beacon 30 and thus introducing spurious data into the ranging calculation which can result in ranging errors.

Figure 4:
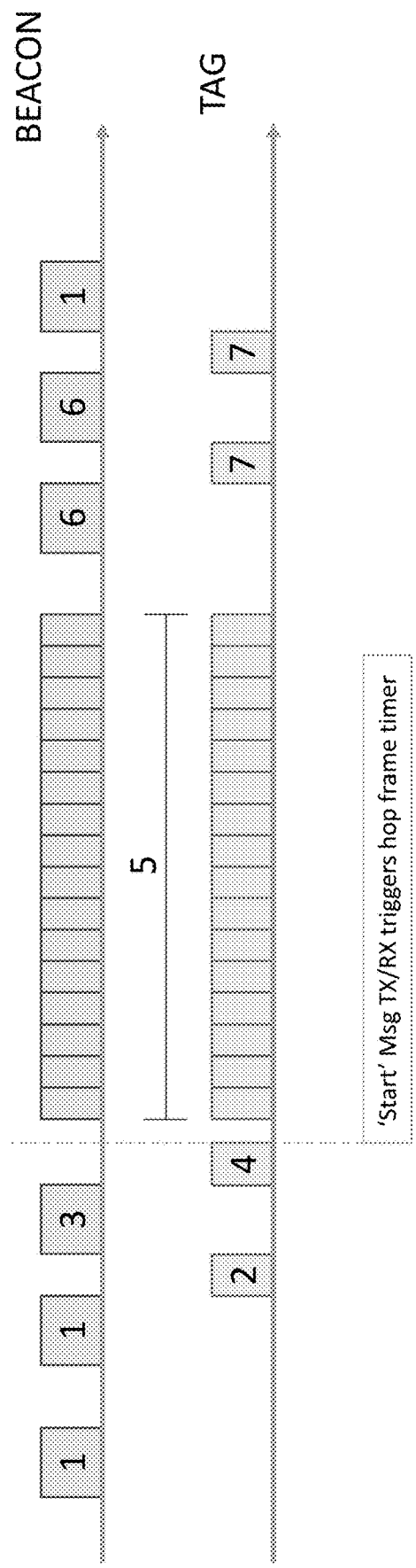
FIG. 4 is an illustration showing timelines for each of a beacon and a tag in the sequence for initiating an exchange of tones and then exchanging tones according to the teachings of the present invention.
Figure 5:
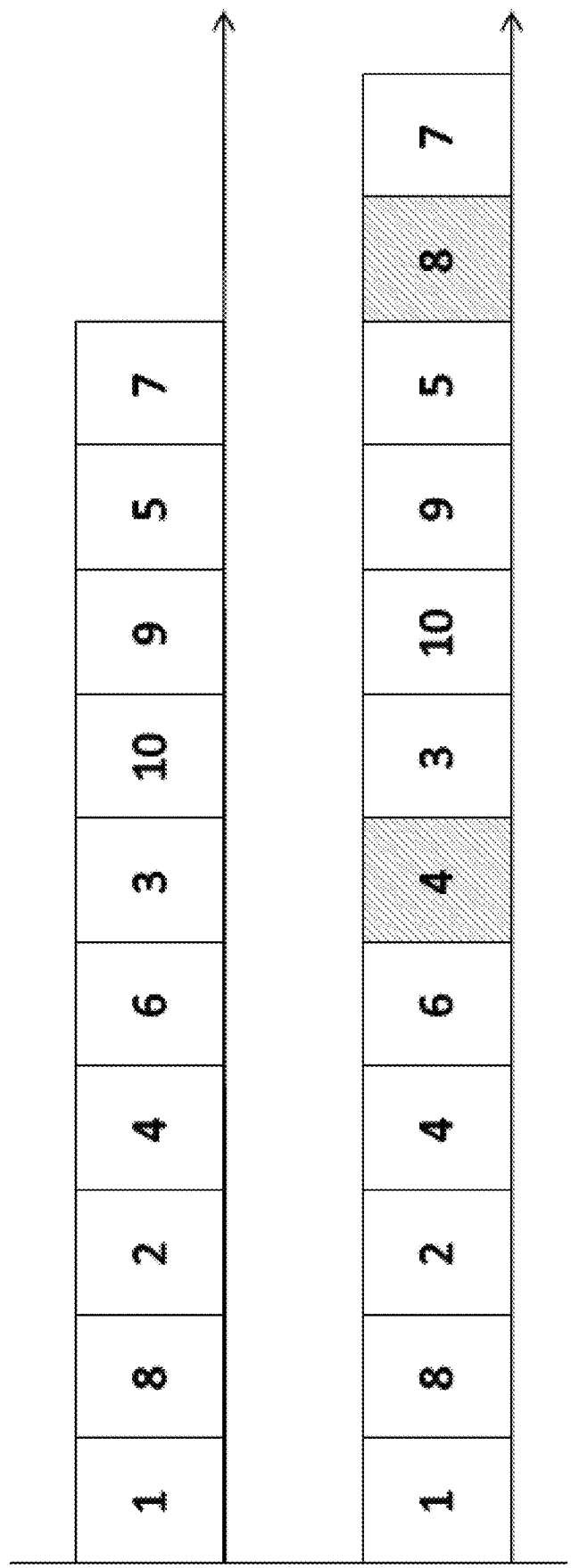
FIG. 5 is a diagram illustrating one aspect of using duplicate hops according to the teachings of the present invention.

Turning now to FIGS. 4 and 5, a description of the process for initiating and exchanging CT tones between tag 20 and beacon 30 according to a preferred embodiment of the present invention is now provided. With reference to FIG. 4, the first step is for beacon 30 to transmit a broadcast message to all tags 20 within range. This is represented by the box labeled "1" on the beacon 30 timeline at the top. Broadcast messages are periodically and repetitively transmitted until such time as acknowledged by tag 20 via a request by tag 20 to begin the ranging process. This acknowledgement and request is represented by the box labeled "2" on the timeline for tag 20.

Upon receipt of the request from tag 20, beacon 30 then acknowledges the request in box "3" by sending an acknowledgement message to tag 20. Following this, tag 20 sends a "start" message to beacon 30 to initiate the ranging timing. This is indicated by the box labeled "4". This starts the hop frame timer which allows beacon 30 and tag 20 to synchronize timing for the series of tone hops which is about to come. In particular, the local oscillators for both tag 20 and beacon 30 must remain in synch and locked during the duration of the hopping process. In a preferred embodiment of the invention, a BLE chip manufactured by Nordic Semiconductor, such as the nRF52833 Bluetooth v4.2 and BT5 chip may be employed in both beacon 30 and tag 20 to provide PPI (Programmable Peripheral Interconnect) and local oscillator capabilities as desirable for implementing the teachings of the present invention.

As noted, once the start message is received by beacon 30, the hop frame timer is triggered for both beacon 30 and tag 20 via, for example the PPI interface. Once synchronized, tag 20 and beacon 30 begin to exchange CT tones across a 100 MHz band in one embodiment of the present invention. This is shown as the set of boxes labeled "5" for both tag 20 and beacon 30. In one embodiment, the 2.4 GHz band is used with a 1 MHz sample rate across a 100 MHz bandwidth, resulting in 100 tone exchanges to be made, although more or less samples could be used across a wider or narrower band and/or in a different licensed or unlicensed band without departing from the scope or spirit of the present invention.

Once the tone exchange is complete, beacon 30 transfers its hop IQ samples to tag 20 in one or more block transmissions which are represented by boxes labeled "6" in FIG. 8. Each receipt of hop IQ samples by tag 20 is preferably acknowledged by tag 20 to beacon 30 as represented by the boxes labeled "7" in FIG. 4.

Turning now to FIG. 5, a depiction of the "duplicate hop" aspect of the present invention is described. In particular, in order to mitigate effects from interference from devices transmitting on the same frequencies as those used by tag 20 and beacon 30 herein, duplicate hops are used as now described. When these duplicate hops are used, data from corrupted hops (generally resulting from interference on that channel by another transmitting device) can be discarded and the duplicate hop for that channel can be added to the sample collection and used in the ranging calculation in place of the corrupted sample.

As shown in FIG. 5, and merely by way of example, duplicate tone exchanges for the same channel may occur in a randomized or pre-determined pattern. The top timeline represents a standard hop map, while the bottom timeline depicts a timeline using hop duplication according to one embodiment of the present invention. In this case, tag 20 first sends a tone on channel 1 which is received by beacon 30 and then tag 20 sends a series of tones on other channels (8, 2, 4 and 6 in this case). Note that at this point a duplicate tone for channel 4 is sent by tag 20 and received by beacon 30. Beacon 30 will mirror the channel sequence initiated by tag 20 in connection with its own tone generation. FIG. 5 also shows that the hop duplication, in this example, also calls for duplication of the channel 8 hop. In a preferred embodiment of the present invention, channels selected for duplicate hops may be those in which interference is expected from competing devices, for example, the frequencies represented by the frequently used WiFi channels referenced as 1 and 6.

As will be described in more detail below, for a hop map with duplicate hops, after all samples are received by tag 20, tag 20 checks each one for interference. This is performed by examining the sample magnitude and comparing it to several of its neighboring channels. In one embodiment, if the magnitude represented by the sample is greater than three (3) times higher than the next highest sample, it is assumed that the hop sample has been corrupted. If so, tag 20 checks if a duplicate sample was collected for this hop and, if it was, then it substitutes the data associated with the duplicate hop. Multiple duplicates for a single hop may be collected (e.g. four duplicate hops for channel 4). In this case, tag 20 repeats the check on the magnitude of the sample versus other samples and swaps for the next duplicate as long as one is available.

Figure 6A:
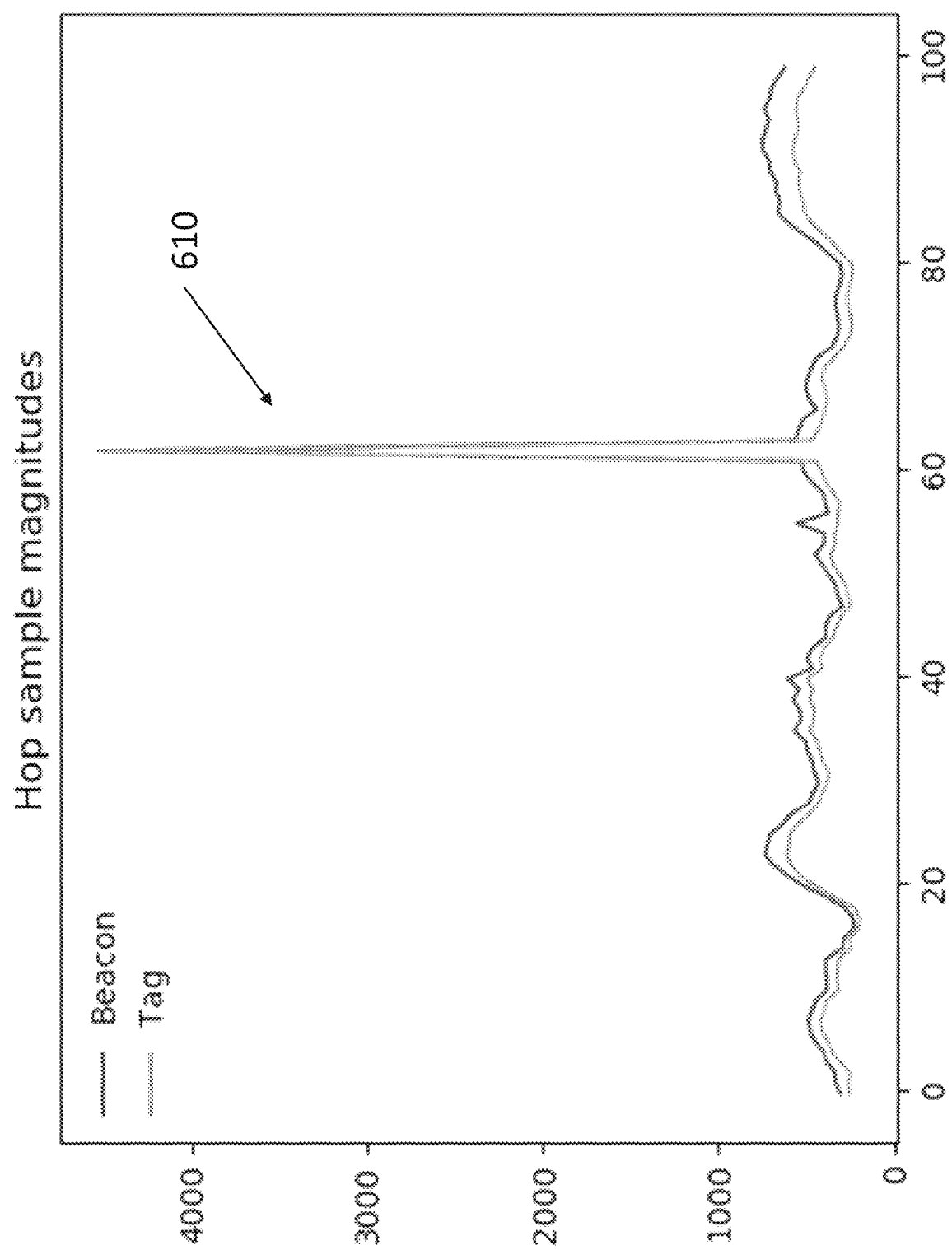
FIGS. 6a and 6b are graphs showing sample hop magnitudes and a resulting range correlation curve, respectively, in the case where the sample set contains a corrupted hop.

With reference now to FIGS. 6a, 6b, 7a and 7b, the benefits associated with the use of duplicate hops will be discussed. FIG. 6a is a plot of the individual hops (100 of them in this case) on the x-axis with the resulting magnitude of the signal received for each of those hops on the y-axis. As can be seen in this exemplary plot, there is a unique high magnitude value 610 for one of the hop channels (at approximately hop 63). Because the signal magnitude for this hop is so much higher than the hop, sample adjacent to it and to its left, it is assumed that the signal received in connection with this hop results from interference and does not therefore represent valid ranging data. In a preferred embodiment of the invention, a hop is considered erroneous when its magnitude value is three times or more higher than the magnitude value for the adjacent hop. As will be apparent to one of skill in the art, other embodiments are possible in terms of both the 3× threshold (higher or lower thresholds can be used) and the hop which is used as the reference (either or both adjacent hops, wider windows for reference peaks, or the whole sample set, for example).

By way of example, the received signal at approximately hop 63 may be reflective of a transmission made by a device using one of the more popular WiFi channels available in the applicable unlicensed spectrum. If the data associated with this hop is included within the collective set of data for determining ranging, the accuracy of the ranging value (the measured power in in the transmission path between beacon 30 and tag 20) could be and would likely be inaccurate. This is demonstrated by FIG. 6b which shows the range correlation curve resulting from the data in FIG. 6a. As noted above, this is generated through the use of the processing algorithms including application of the IFFT as described above.

Figure 6B:
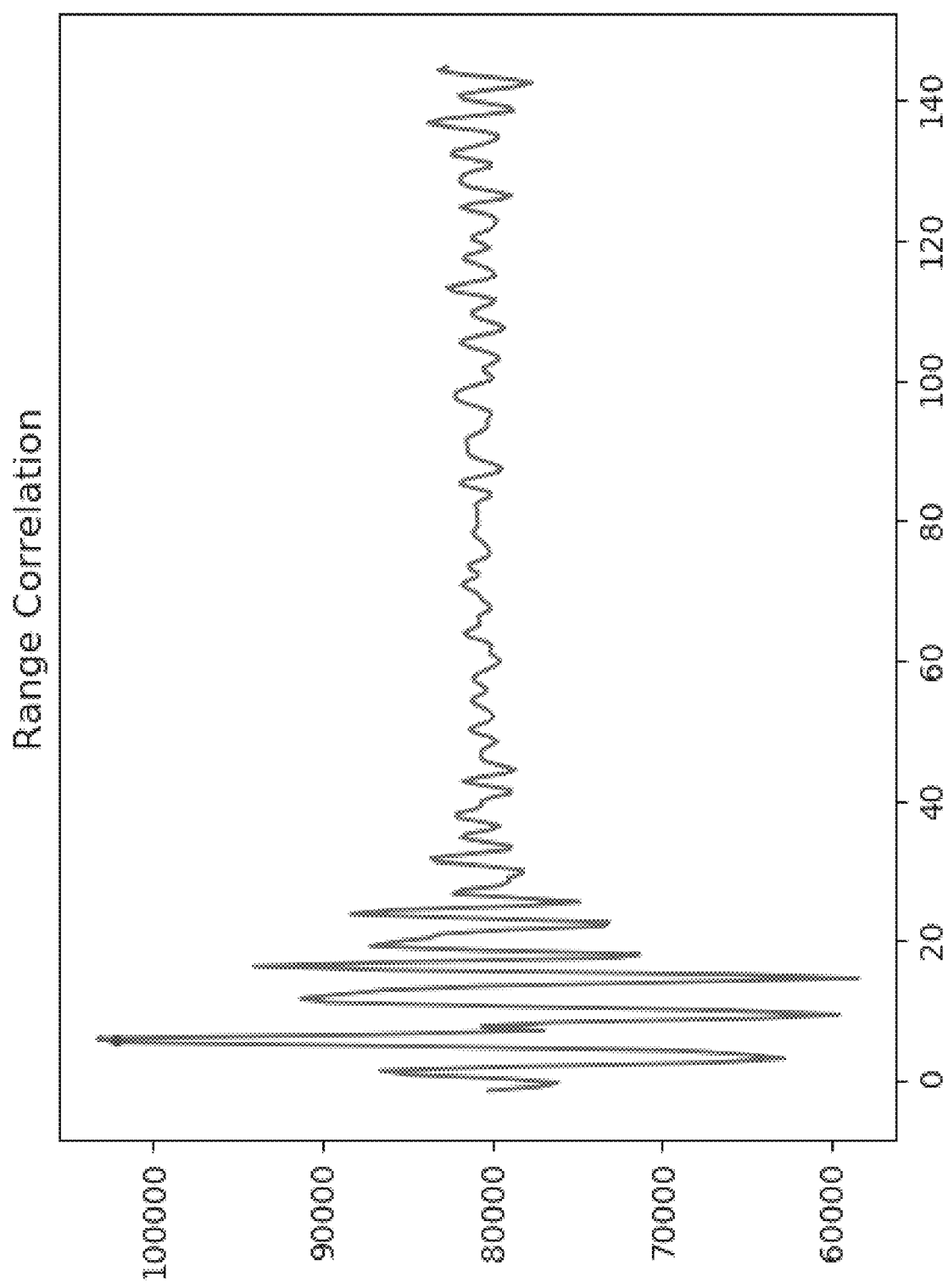

The range correlation curve in FIG. 6b is undesirable in that it is hard to truly determine the true ranging value (along the x-axis) due to the many power peaks which are all largely similar along the y-axis. In addition, the correlation curve in this figure is less than ideal due to the effect of the very high magnitude of the one erroneous hop which skews all of the data to higher y-axis values again making it harder to determine the true ranging value.

Figure 7A:
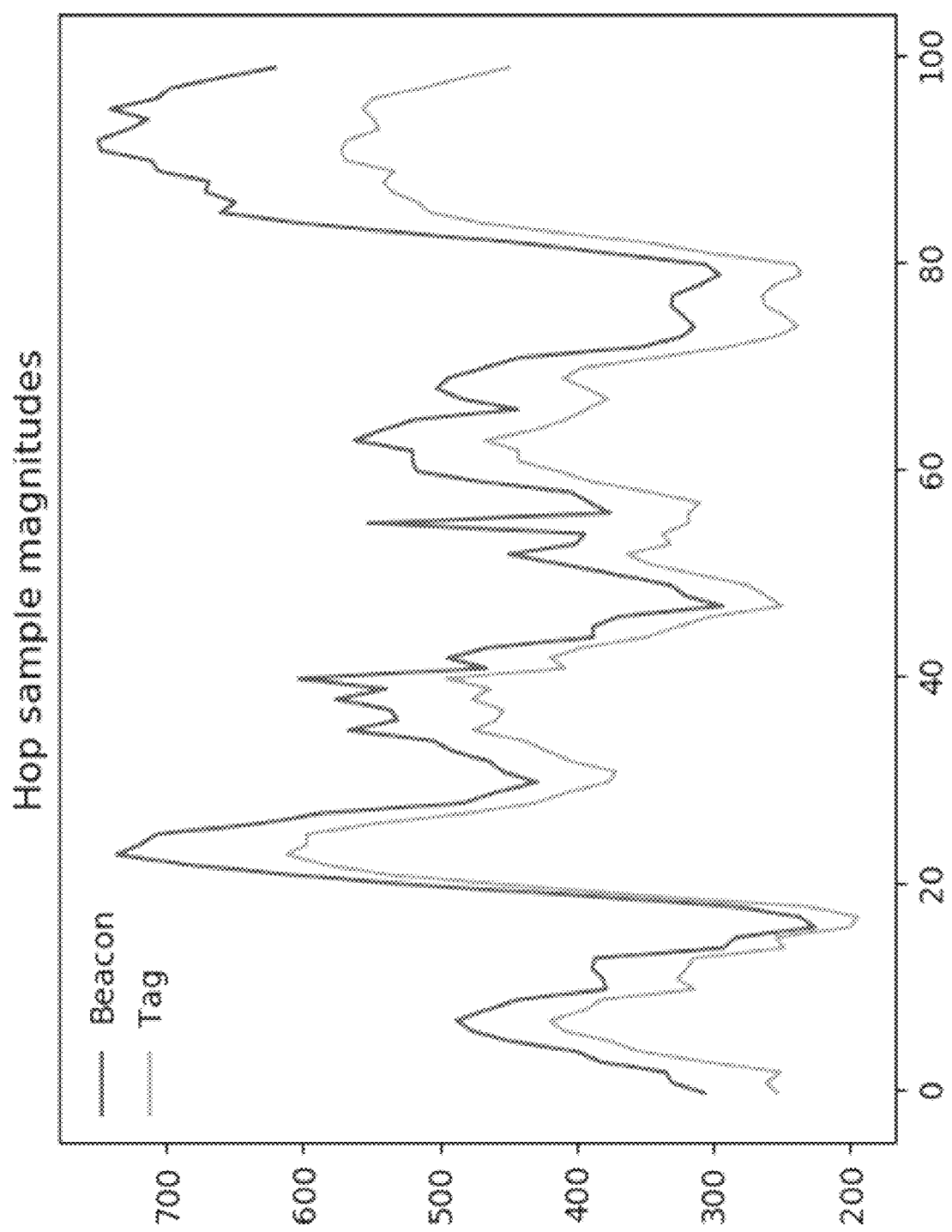
FIGS. 7a and 7b are graphs showing sample hop magnitudes and a resulting range correlation curve, respectively, in the case where the corrupted hop has been removed from the sample set according to the teachings of the present invention.
Figure 7B:
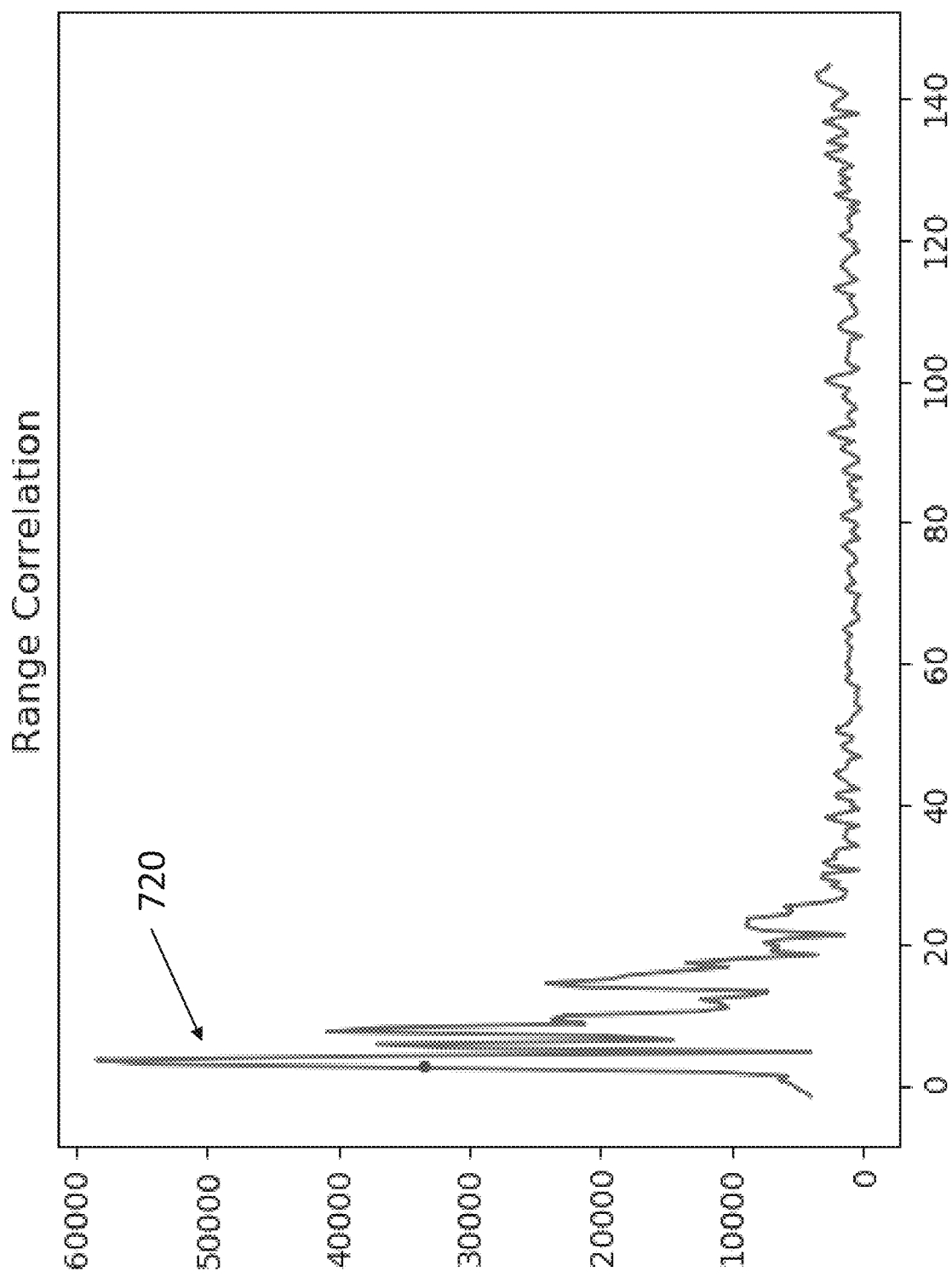

In contrast to the foregoing, FIG. 7a represents a plot of magnitude values for the same 100 hops but in this case the erroneous hop magnitude value at around hop 63 has been discarded and replaced with the data from a duplicate hop for the hop at hop 63. As a result, all amplitude values are within a much tighter range and when the processing to create the correlation curve is applied, a much more usable correlation curve is generated as demonstrated in FIG. 7b. In this case, a clear peak 720 demonstrating the most likely range value is available at or around 8 meters.

Another aspect of the present invention, referred to as "hop interpolation" is now discussed. In a preferred embodiment of the present invention, hop interpolation is used only if the aforementioned hop duplication process fails to provide a usable ranging result. This may typically occur in the case where one or more of the hops was erroneous due to interference and there was not a duplicate hop for that hop available for use. Alternatively, there may have been one or more duplicate hops available but those may also have been erroneous/corrupted due to interference or some other reason.

In this case, the novel hop interpolation process of the present invention may be implemented in an effort to obtain a usable ranging value despite corruption of one or more hops even with the use of hop duplication. The hop interpolation process according to a preferred embodiment of the present invention is implemented as follows:

1) After any duplicate hops have been used, tag 20 multiplies its local samples with those transmitted by beacon 30;
2) Tag 20 then scans through the hop magnitudes again, looking for interference.
3) If tag 20 detects a corrupted sample, it removes it and uses the neighboring channels (for example, the immediately adjacent channels, although other channel selection methodologies could also be used) to interpolate a value for the hop.

Figure 8A:
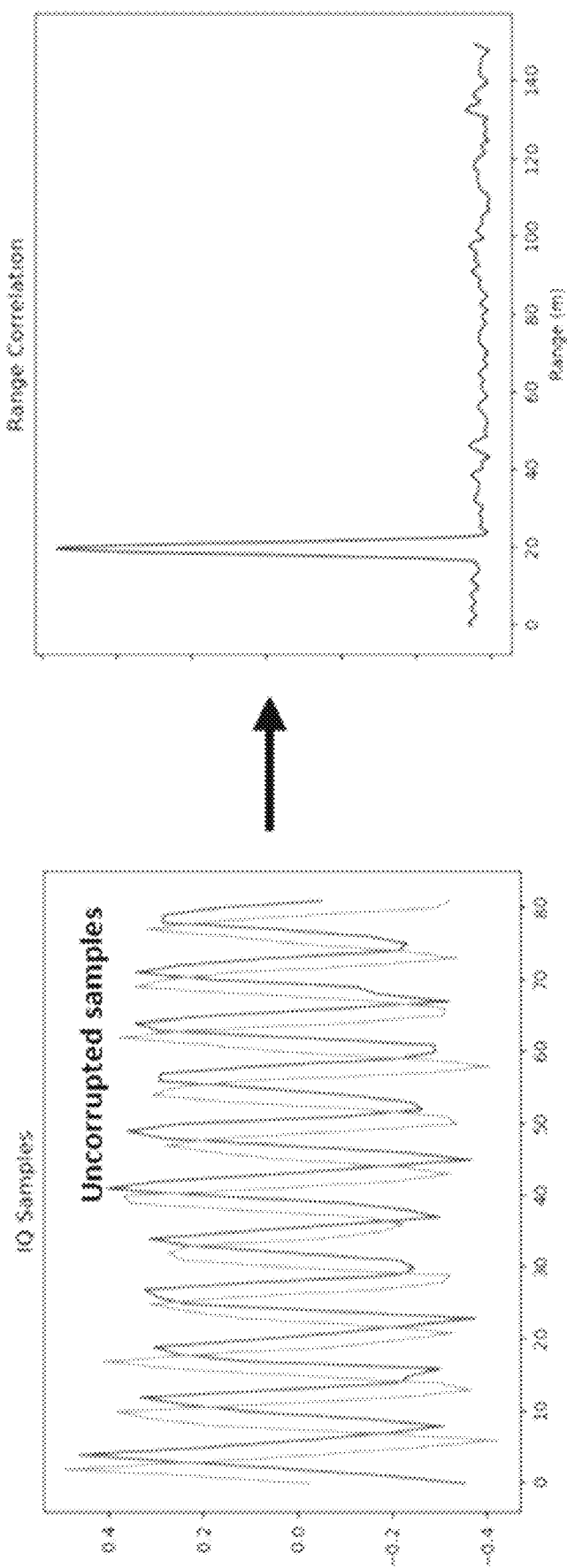
FIG. 8a are graphs showing sample hop magnitudes for both a beacon and a tag and a resulting range correlation curve, respectively, in the case where the sample set contains no corrupted hops.
Figure 8B:
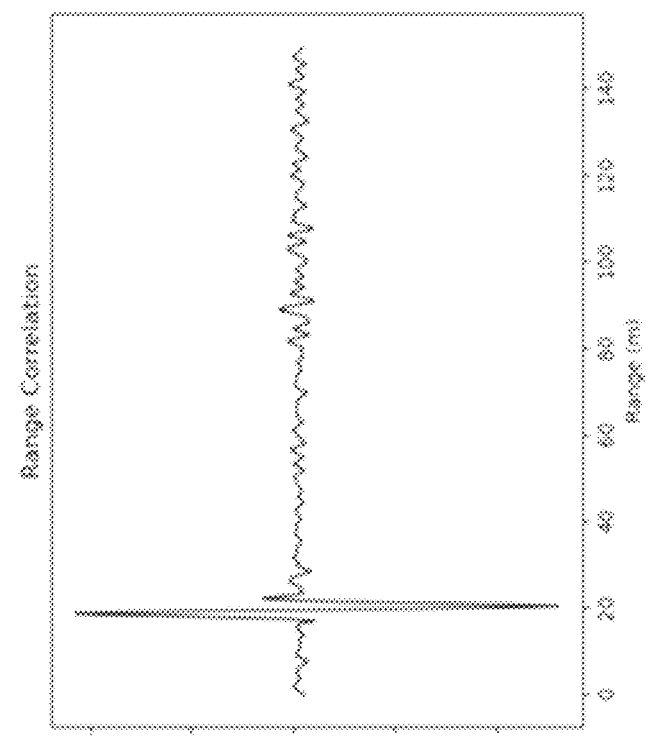
FIG. 8b are graphs showing sample hop magnitudes for both a beacon and a tag and a resulting range correlation curve, respectively, in the case where the sample set contains one corrupted hop.
Figure 8B:
Figure 8B:
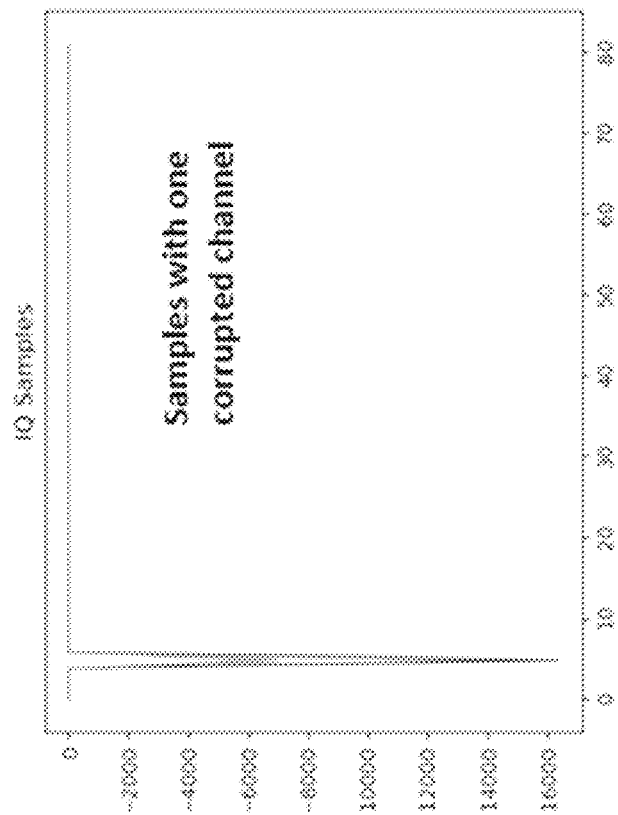
Figure 8C:
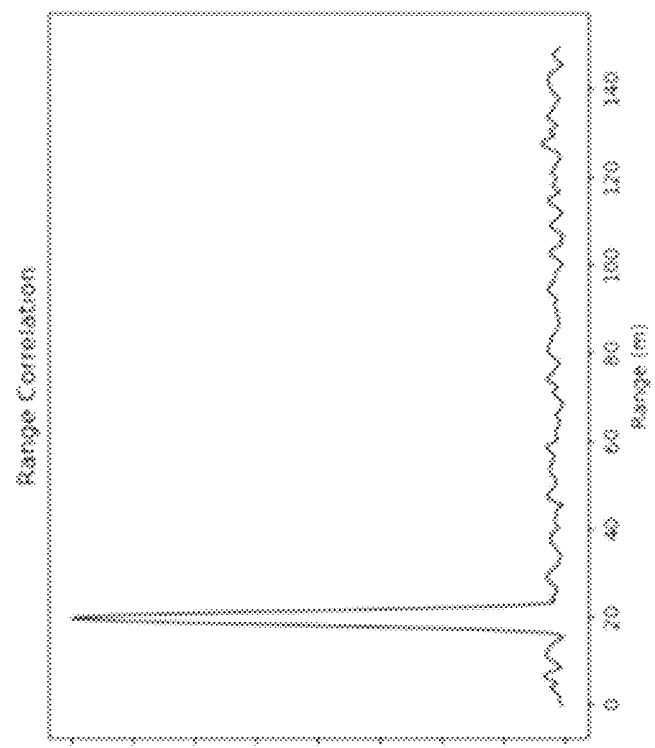
FIG. 8c are graphs showing sample hop magnitudes for both a beacon and a tag and a resulting range correlation curve, respectively, in the case where the corrupted hop has been replaced with an interpolated value according to the teachings of the present invention.
Figure 8C:
Figure 8C:
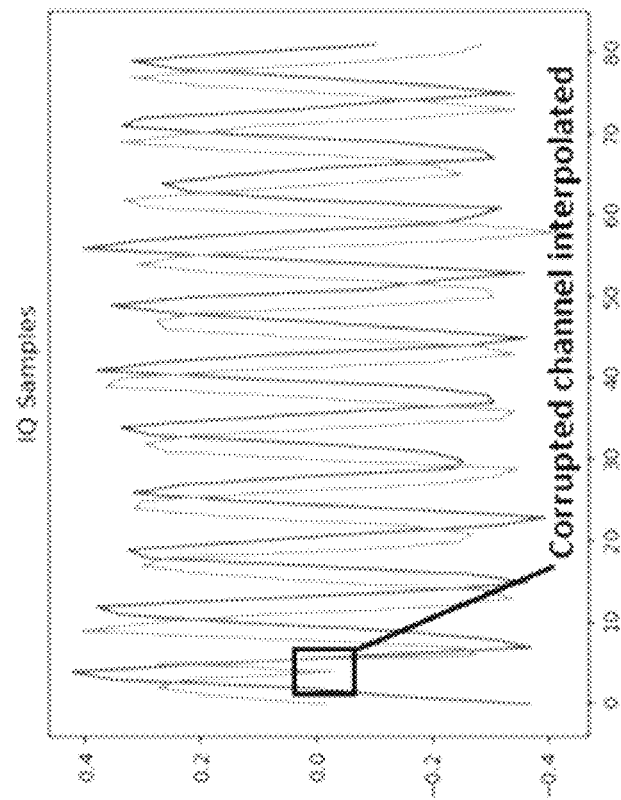

According to a preferred embodiment, tag 20 also maintains a count of interpolated channels and if they exceed a configurable threshold, for example, more than 3 interpolated channels, tag 20 determines that the range measurement is corrupted beyond repair and is invalidated. With reference now to FIGS. 8a, 8b and 8c, a discussion of the effects on range correlation when hop interpolation is used is now provided.

FIG. 8a shows IQ samples associated with both tag 20 and beacon 30 when the sample data set contains no corrupted hops. In this case, the range correlation curve generated through the use of the IFFT as discussed above reflects a single non-ambiguous peak at around 20 meters.

In contrast to this, FIG. 8b shows a set of IQ samples which contains a single corrupted channel. This may have resulted from not having an available duplicate hop to replace the corrupted channel. As can be seen in this figure, the resulting range correlation curve is undesirable because of the ambiguity in the peaks as well as the skewing of the amplitude values overall based on the single erroneous hop.

FIG. 8c illustrates the use of the hop interpolation methodology of the present invention. In this case, the corrupted hop has been replaced by the ranging data associated with a neighboring hop. This, in turn, results in a range correlation curve that is desirable in that it contains a single unambiguous peak at around 20 meters.

In the system 100 of the present invention, the receivers used by tags 20 and beacons 20 may be Zero-IF or Direct Conversion receivers. These receivers demodulate the incoming signal using a local oscillator whose frequency is identical to or very close to the carrier frequency of the received signal. This has the benefit of reducing circuit complexity. However, one issue associated with these receiver types are DC biases which are often present.

In a Zero-IF receiver, a bandwidth is converted directly from RF frequencies to baseband via quadrature down-conversion and sampled. Ideally, the spectrum of this sampled, baseband signal is identical to that of the input RF signal spectrum. In practice, it can be difficult to prevent unwanted content at zero hertz. This can be due to a number of factors: uncompensated DC biases in the receiver's Analog to Digital Converters (ADCs), or leakage from the receiver's local oscillator (LO) which appears at zero hertz after down-conversion. The amount of DC offset may be influenced by receiver gain circuitry, making it difficult to characterize and compensate. Further, the receiver may not be equipped with the necessary components to calibrate the system (e.g. means to inject an appropriate test signal).

In phase ranging systems, such as system 100 in which phase measurements are captured across a broad bandwidth, differences in DC offsets as a function of frequency can cause significant degradation in ranging accuracy. The present invention includes a method for detecting and compensating for these DC offsets during phase ranging measurements, in real-time, with no additional hardware being required beyond the radio receiver. The method is as follows:

1. The remote node (tag 20) in the system begins transmitting its CT tone at the first hop frequency at time to and stops transmitting at time
2. The local node (beacon 30) begins sampling the remote node's tone at time $t_0$, and continues to sample until time $t_2 > t_1$.

3. The local node scans through the IQ samples captured between $t_1$ and $t_2$, calculating the magnitude of each.
4. The samples with the lowest magnitude are then subtracted from the IQ samples captured between to and Note that while the remote node is identified as tag 20 and the local node is identified as beacon 30, these assignments can be reversed and both tag 20 and beacon 30 function as transceivers. The example provided herein thus assumes transmission by tag 20 but the same principle applies when beacon 30 is the transmitter.

Figure 9:
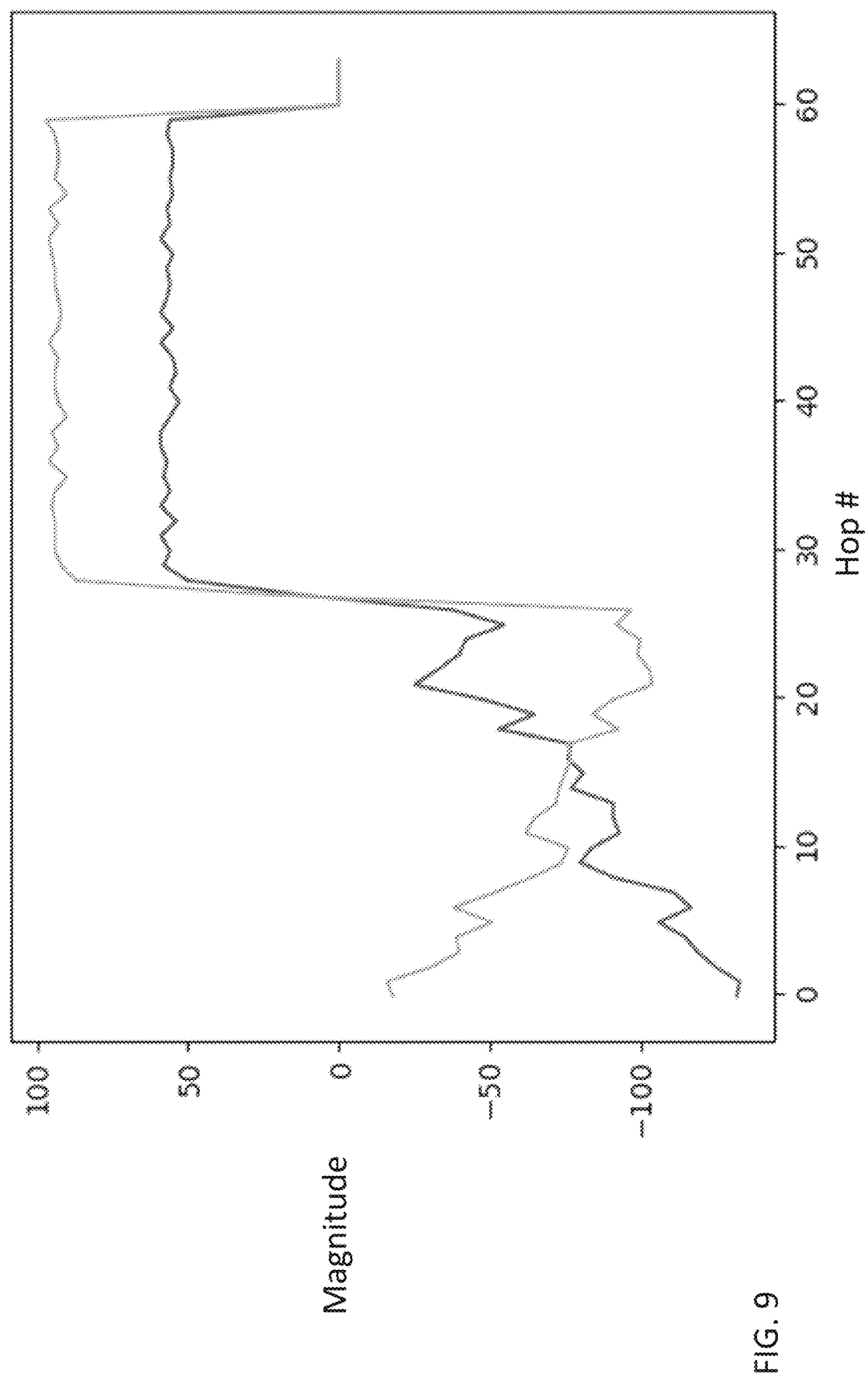
FIG. 9 is a graph illustrating the hop measurement technique which compensates for DC offsets during phase ranging according to a preferred embodiment of the present invention.

With reference now to FIG. 9, an example hop measurement resulting from the application of this novel methodology is shown. Tag 20 stops transmitting at around sample 28 or so, but the receiver (beacon 30) continues sampling. The I and Q DC levels are visible between sample 29 and 60, after which beacon 30 is disabled from receiving additional hops.

In FIG. 9, the period after sample hop 28 is free of interference. In practice, there is no guarantee that no other signals are on air during this time. This is why searching for the minimum magnitude sample is important—if there is a sample free from interference, then it will have the lowest magnitude and will represent the ADC's DC bias.

Since these measurements are made for each hop, every time a measurement is taken it will reflect any changes in DC bias levels due to, e.g., temperature fluctuations, receiver frequency response, or receiver gain settings. As such, by eliminating fluctuation of the DC level across the band, errors in phase measurements which are used during the ranging process can be eliminated/mitigated so as to enhance ranging accuracy.

In view of the above, it will be recognized that, by enacting each of the above hop duplication and/or hop interpolation, that the tag 20 realizes at least several below-described advantages affording a practical application of its processing.

First, and because the tag 20 optimizes its operation to substantially mitigate multipath interference, a size of the tag 20, resulting from a decreased need for unnecessary battery capacity, may otherwise be reduced when compared to such a tag 20 that is not equipped for such optimization. This is the case since, for example, unnecessary iterative measurement of ranging to a given beacon 30 is reduced as a result of removal of corrupted sampling. Said otherwise, ranging by the tag 20 may be empirically proven to be superior to another tag which is not equipped to operate as described herein. Furthermore, because ranging is optimized, determination of the tag's coordinate location is also optimized, thus avoiding the need for recalculation and commensurate increased battery capacity.

Second, and because the tag 20 optimizes its operation to substantially mitigate multipath interference as described herein, such aforementioned avoidance of iterative measurement of ranging and recalculation of coordinate location effects conservation of battery usage. As a result, the tag 20 experiences increased battery longevity so as to be available for more extended and varied applications such as those involved when tracking various types and amounts of resources.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system, comprising:
   at least one tag;
   a plurality of beacons in wireless communication with said at least one tag;
   wherein said at least one tag is configured to:
      initiate a connection with at least one of the plurality of beacons;
      transmit a Constant Tone (CT) to the at least one of the plurality of beacons;
   wherein each one of the plurality of beacons is configured to:
      receive the CT, and sample the CT in in-phase and quadrature (IQ) format;
      transmit the sampled CT, and a signature CT,
   wherein the said sampled CT comprises a plurality of hops wherein there exists at least one duplicate hop for at least one of said sampled CT hops.

2. The system of claim 1 wherein said at least one duplicate hop is made at the same frequency as an original sampled CT hop.

3. The system of claim 1 wherein said signature CT comprises a plurality of hops wherein there exists at least one duplicate hop for at least one of said signature CT hops.

4. The system of claim 3 wherein said at least one duplicate hop is made at the same frequency as an original signature CT hop.

5. The system of claim 1 wherein said plurality of hops comprises a plurality of CT transmissions at sequential frequencies along a selected frequency band.

6. The system of claim 1 wherein said duplicate hop is used in place of an original hop at the same frequency in order to generate a ranging correlation curve when said original hop is corrupted.

7. The system of claim 6 wherein when said at least one duplicate hop is corrupted, said system interpolates replacement data for said duplicate hop by using an adjacent channel's ranging data in place of data associated with said duplicate hop when generating said ranging correlation curve.

8. The system of claim 1 further comprising a DC offset correction capability wherein hop transmissions are terminated by said at least one tag prior to the completion of all hops within a predetermined frequency band provided that hop sampling by said at least one beacon continues for a predetermined time following the termination of hop transmissions by said at least one tag and wherein the samples with the lowest magnitude which are transmitted by said at least one tag are removed from the sample set prior to generation of a range correlation curve.

9. The system of claim 1 further comprising a DC offset correction capability wherein hop transmissions are terminated by said at least one beacon prior to the completion of all hops within a predetermined frequency band provided that hop sampling by said at least one tag continues for a predetermined time following the termination of hop transmissions by said at least one beacon and wherein the samples with the lowest magnitude which are transmitted by said at least one beacon are removed from the sample set prior to generation of a range correlation curve.

10. A method comprising the steps of:
locating a plurality of beacons in wireless communication with said tag;
initiating a connection between said tag and at least one of the plurality of the beacons;
said tag transmitting a Constant Tone (CT) to the at least one of the plurality of beacons;
said at least one beacon receiving the CT, and sampling the CT in in-phase and quadrature (IQ) format;
said at least one beacon transmitting the sampled CT, and a signature CT;
wherein the said sampled CT comprises a plurality of hops wherein there exists at least one duplicate hop for at least one of said sampled CT hops.

11. The method of claim 10 wherein said at least one duplicate hop is made at the same frequency as an original sampled CT hop.

12. The method of claim 10 wherein said signature CT comprises a plurality of hops wherein there exists at least one duplicate hop for at least one of said signature CT hops.

13. The method of claim 12 wherein said at least one duplicate hop is made at the same frequency as an original signature CT hop.

14. The method of claim 10 wherein said plurality of hops comprises a plurality of CT transmissions at sequential frequencies along a selected frequency band.

15. The method of claim 10 wherein said duplicate hop is used in place of an original hop at the same frequency in order to generate a ranging correlation curve when said original hop is corrupted.

16. The method of claim 15 wherein when said at least one duplicate hop is corrupted, said system interpolates replacement data for said duplicate hop by using an adjacent channel's ranging data in place of data associated with said duplicate hop when generating said ranging correlation curve.

17. The method of claim 10 further comprising a DC offset correction capability wherein hop transmissions are terminated by said tag prior to the completion of all hops within a predetermined frequency band provided that hop sampling by said at least one beacon continues for a predetermined time following the termination of hop transmissions by said tag and wherein the samples with the lowest magnitude which are transmitted by said tag are removed from the sample set prior to generation of a range correlation curve.

18. The method of claim 10 further comprising a DC offset correction capability wherein hop transmissions are terminated by said at least one beacon prior to the completion of all hops within a predetermined frequency band provided that hop sampling by said tag continues for a predetermined time following the termination of hop transmissions by said at least one beacon and wherein the samples with the lowest magnitude which are transmitted by said at least one beacon are removed from the sample set prior to generation of a range correlation curve.

* * * * *